United States Patent [19]

Hold

[11] 4,030,177

[45] June 21, 1977

[54] CONTROLLED DEFLECTION ROLL

[75] Inventor: Peter Hold, Milford, Conn.

[73] Assignee: USM Corporation, Boston, Mass.

[22] Filed: Sept. 23, 1976

[21] Appl. No.: 725,870

Related U.S. Application Data

[63] Continuation of Ser. No. 583,860, June 4, 1975, abandoned.

[52] U.S. Cl. .................................. 29/116 AD
[51] Int. Cl.² .................................. B21B 13/02
[58] Field of Search ... 29/116 AD, 113 AD, 116 R; 100/162 B

[56] References Cited

UNITED STATES PATENTS

| | | | |
|---|---|---|---|
| 2,960,749 | 11/1960 | Robertson et al. | 29/116 R X |
| 3,043,211 | 7/1962 | Appenzeller | 29/113 AD |
| 3,119,324 | 1/1964 | Justus | 29/116 AD X |
| 3,328,866 | 7/1967 | Robertson | 29/116 AD |
| 3,416,435 | 12/1968 | Dahl et al. | 29/116 AD X |
| 3,443,295 | 5/1969 | Denoyer et al. | 29/116 AD |
| 3,587,152 | 6/1971 | Hold | 29/116 AD |
| 3,731,357 | 5/1973 | Sharai | 29/116 AD X |
| 3,802,044 | 4/1974 | Spillman et al. | 29/113 AD |
| 3,869,774 | 3/1975 | Gallant et al. | 29/116 AD |
| 3,932,921 | 1/1976 | Biondetti | 29/116 AD |

FOREIGN PATENTS OR APPLICATIONS 47-7721  3/1972  Japan .......................... 29/116 AD Primary Examiner—Alfred R. Guest
Attorney, Agent, or Firm—Donald N. Halgren; Richard B. Megley; Vincent A. White

[57] ABSTRACT

External bending of an inner shaft improves the performance of hydrostatic bearings in a controlled deflection roll arrangement. A deflection sensing member within the deflection roll sends signals through a control circuit to a biasing arrangement near the ends of the shaft that applies a force into the inner shaft, causing it to bend and counter any deflection in the roll.

6 Claims, 3 Drawing Figures

CONTROLLED DEFLECTION ROLL

This is a continuation of application Ser. No. 583,860, filed June 4, 1975 now abandoned.

BACKGROUND OF THE INVENTION

1. Field of the Invention

This invention relates to rolling machines and, more particularly, to controlled deflection rolls comprising an inner nonrotative shaft having a roll shell journaled about it, the inner shaft being automatically and controllably bent in an opposed manner to insure straightness of the outer roll shell.

2. Description of the Prior Art

Roll pressing mechanisms generally employ parallel rolls positioned to form pressure nips for rolling materials between them which causes a deflection of the rolls due to forces at the nip, and due to natural forces within the rolls themselves. Other mechanisms employ rolls that are subject to deflection forces, such as those carrying a traveling belt or web. In press roll couples, and in other roll arrangements wherein a pair of rolls are in a nip defining relationship with one another, the algebraic summation of the weight, the nip forces, and the bending movements produced by the journal loading, tend to produce in each of such rolls a curvature of its centroidal axis, in accordance with known laws governing the flexure of materials under strain.

A variety of arrangements have been devised to reduce the effect of such deflection within the roll. U.S. Pat. No. 3,587,152, assigned to the assignee of the present invention, discloses a hydrostatic bearing arrangement on a nonrotative shaft having a roll shell journaled about it. The hydrostatic bearings which deflect the nonrotating shaft have the capability within limits to transmit forces between the surface of a hydrostatic plunger portion of the bearing and the inner roll shell, even if the surfaces are not axially aligned due to deflection of the inner shaft. U.S. Pat. No. 3,443,295 shows a table roll having an inner shaft that has bolts on ends of the shaft which may be manually turned inwardly to cause the shaft ends to deflect downwardly, thereby creating an upward bend across the middle of the shaft.

Another arrangement for controlling deflection is described in U.S. Pat. No. 3,802,044, which discloses a roll journaled about a shaft, the shaft having tiltable pistons for compensating against any deviation in position between the shaft and the roll shell.

Further art is found in U.S. Pat. Nos. 3,869,774; 3,731,357; 3,416,435 and 3,119,324. Some of these prior art devices are unduly complicated and none utilizes the combination and general functioning of hydrostatic bearings with counter bending of nonrotative shafts in an automatic and controlled manner, as described in the present invention.

BRIEF SUMMARY OF THE INVENTION

According to the present invention, a roll shell is journaled about an extended nonrotative shaft. The shaft contains an arrangement of pistons, the outer end of each comprising a hydrostatic bearing which supports the roll shell internally. The shaft has a support arrangement beyond each end of the roll shell. A biasing member is disposed either on each end of the shaft or between the support and the end of the roll. Each biasing member is responsive to signals generated by sensors on or within the shaft. The sensors detect forces of pressure or strain and relay the signal through a circuit arrangement to the biasing members which may then apply force to certain points on the shaft. This causes the shaft to bend about the supports and create a deflection therein to counter any deflection detected by the sensors. This signal generation is automatic and may be in response to fluid pressure at the piston or it may be in response to strain caused by deflection of the shaft itself.

BRIEF DESCRIPTION OF THE DRAWING

The invention, along with the objects and advantages thereof will be best understood from the following detailed description taken in conjunction with the accompanying drawings in which.

DESCRIPTION OF THE PREFERRED EMBODIMENTS

Figure 1:
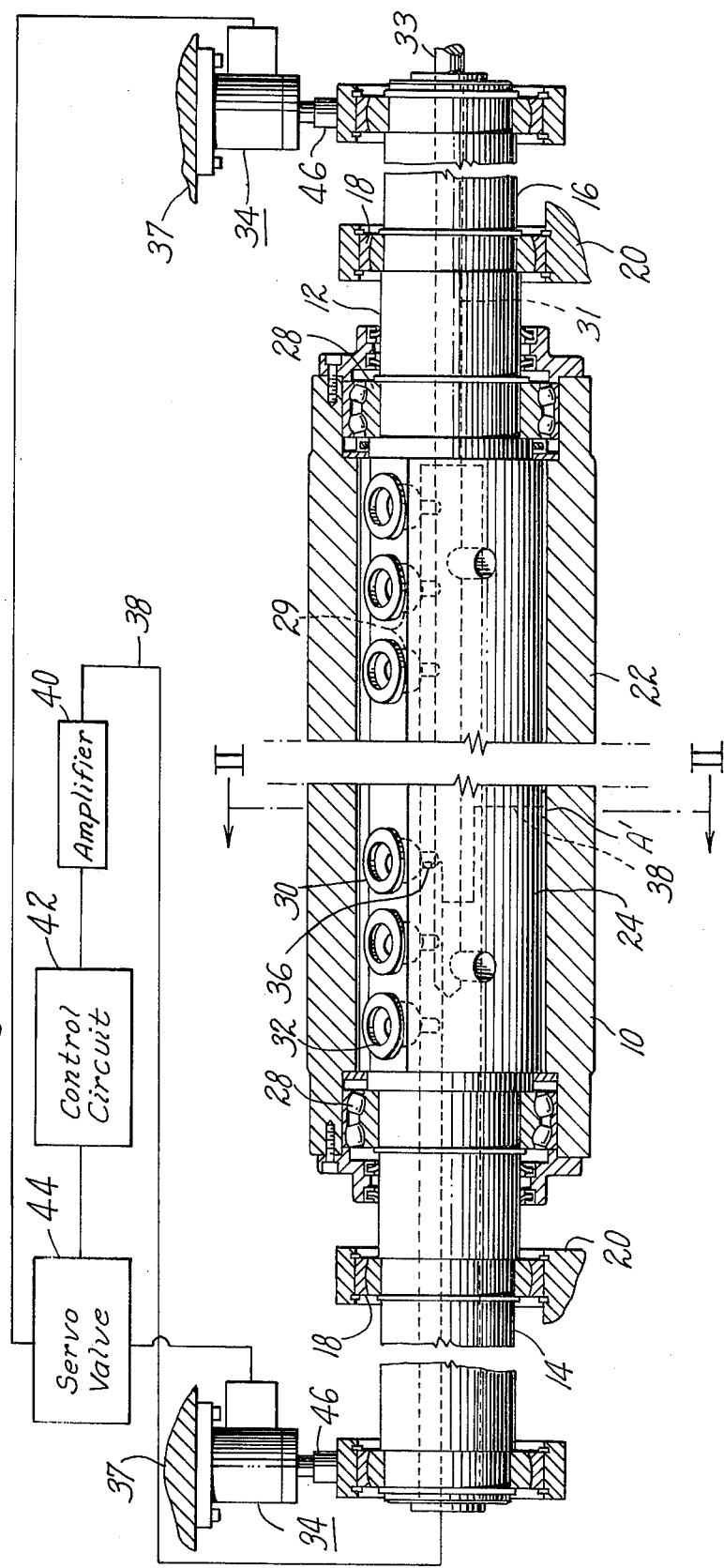
FIG. 1 shows a shell roll, shaft, and biasing arrangement embodying the present invention in a partial vertical longitudinal section.
Figure 2:
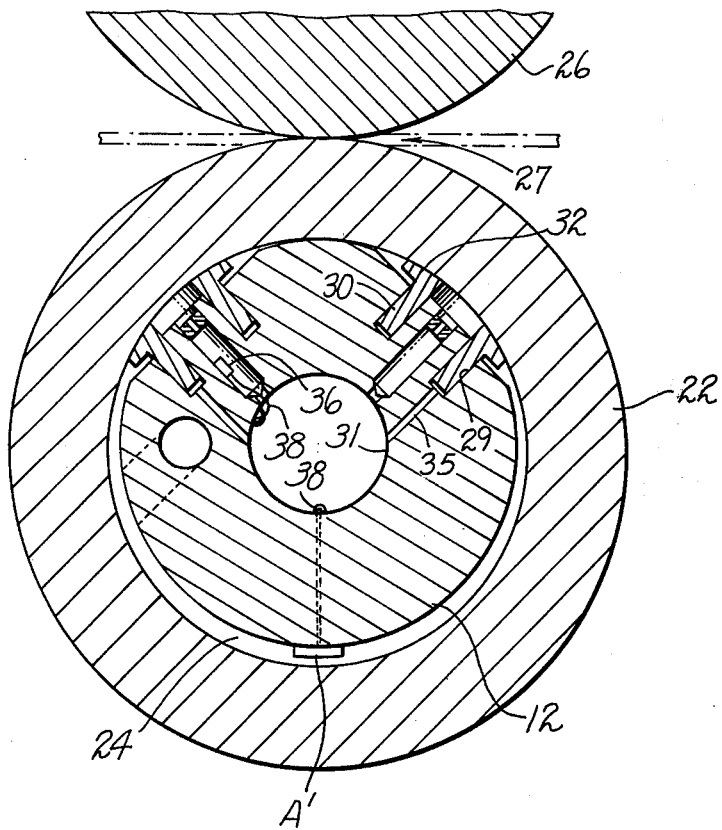
FIG. 2 is a view taken along the lines II—II in FIG. 1.

Referring to the drawings, and particularly to FIG. 1, there is shown a controlled deflection roll 10 comprising preferably a nonrotative inner shaft 12 having its opposite ends, 14 and 16, mounted by rocking bearings 18 which are each supported by a first frame member 20 of a machine using the roll 10. A shell roll 22 is journaled about the shaft 12 with a radial space 24 therebetween. It is to be understood that the machine utilizes a counter roll 26, as shown in FIG. 2, when the machine is operated. The pair of rolls, 10 and 26, form a pressure rolling nip 27 between one another, the rolling pressure tending to deflect the shell roll 22 and shaft 12 downwardly like a beam flexing under a load. In many product applications however the shell roll 22 should remain straight. In the present instance, the shell roll 22 is journaled on an array of self-aligning roller bearings 28 on the shaft 12 similar to the shaft shown in U.S. Pat. No. 3,587,152, assigned to the assignee of the present invention. An arrangement of radially directed cylinders 29, each containing a reciprocative piston 30, is disposed in the shaft 12. Each piston 30 has a hydrostatic bearing pad 32 located on its outer end with which it engages the inner surface of the shell roll 22, the pressurized reciprocation of which helps control roll deflection by transferring the deflection force to the shaft 12. The piston 30 and bearing pad 32 have a fluid flow passageway therethrough for maintenance of lubrication of the bearing pad 32 and the inner surface of the shell roll 22. Each piston 30 is most effective when the shaft 12 is maintained straight even though the shaft 12 is supported only near its ends. The shaft 12 may be controllably bowed upwardly to counter the deflection produced by the weight of the roll 22 and any external load it carries so that it may function in approximately a straight condition.

Figure 3:
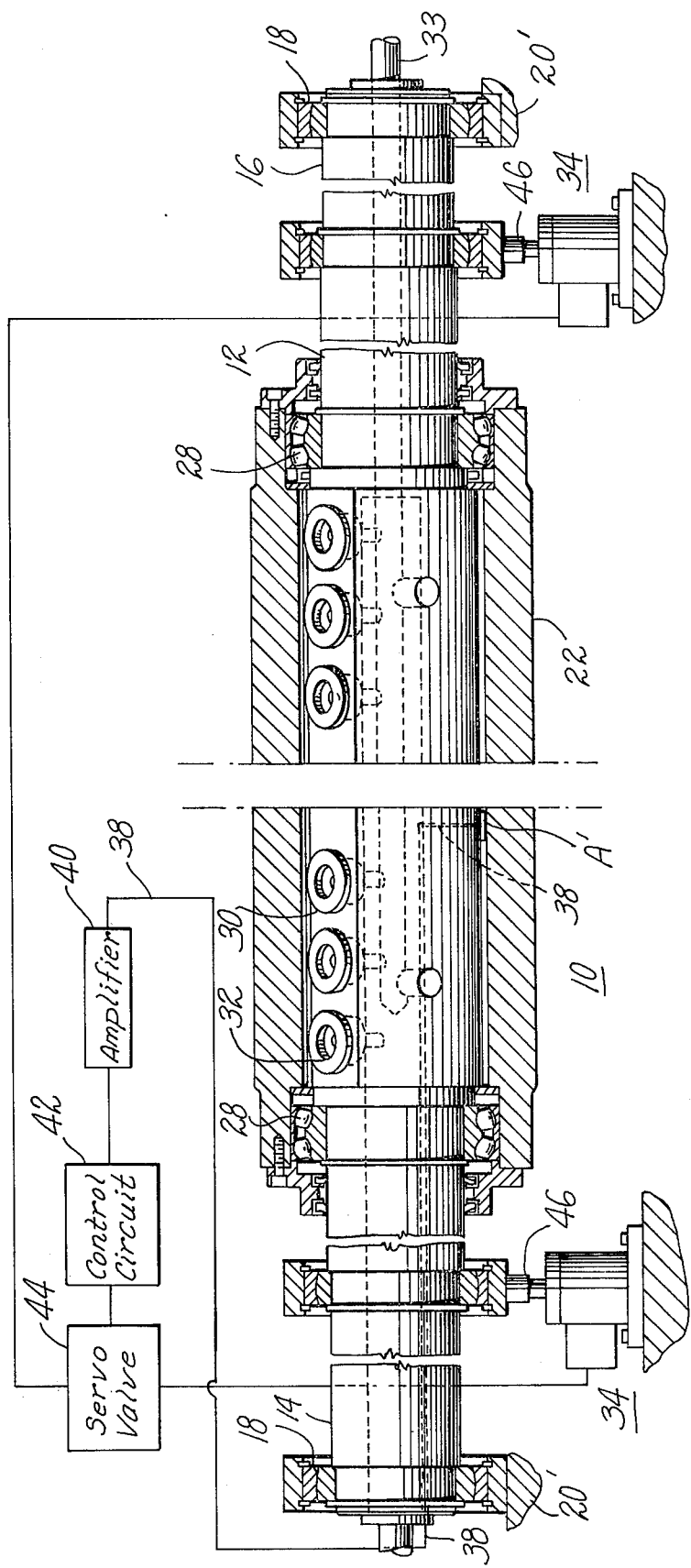
FIG. 3 is an alternative embodiment showing the biasing arrangements in different locations.

The deflection is controlled partially by the hydrostatic bearing pads 32. Their relationship with the shaft 12 is described in more detail in the aforementioned U.S. Pat. No. 3,587,152, issued June 28, 1971 in the name of the present inventor. The shaft 12 has an axial conduit or passageway 31 for a fluid, usually oil, which applies a radially directed pressure to the pistons 30 and to the hydrostatic bearing pads 32, this passageway 31 being accessible as at 33 from one end of the shaft 12 so that it may be supplied with fluid through the conduit 31 under pressure. The conduit 31 connects the pistons 30 through an array of branch lines 35 with the inner end portions of the cylinders 29 behind the pistons 30 so as to force the pistons radially outwardly to apply pressure to support the roll against deflection, as shown in FIG. 3. The deflection of the shaft and roll is completely controlled by a biasing arrangement 34 acting symbiotically with the hydrostatic bearing pads 32. The biasing arrangement 34 is mounted on another support segment 37 of the machine. This method of cooperation between the shaft 12, the biasing arrangements 34, and the bearing pads 32 reduces any chance of misalignment of the movable bearing pads 32 which would impair their proper function.

Disposed within or near the bearing pads 32 in the shaft 12 is a sensor 36, shown in FIG. 2, which may preferably be a pressure responsive device. The sensor 36 determines the fluid pressure at the bearing pad 32 and sends a signal through a feedback network 38 to an amplifier arrangement 40. The simplified signal is sent to a switching and control circuit 42 which causes an appropriate response in a hydraulic (or other fluid such as air) servo valve arrangement 44 and establishes the appropriate pressure in the biasing member 34. The biasing member 34 is preferably comprised of a pressurizable hydraulic or pneumatic fluid cylinder arrangement 46, and may be disposed at a point on or near each end of the shaft 12 beyond each respective support frame member 20. The fluid cylinders 46 apply a bending force to the shaft 12 in response to the proper controlled signal with each frame member 20 acting as a fulcrum. The magnitude of the bending movement is automatically controlled in order to achieve the objective, namely, a close conformation between the deflection of the roll shell 22 and the counterbending of the inner shaft 12.

An alternative embodiment of the biasing arrangement 34 is shown in FIG. 3 wherein the fluid cylinders 46 are disposed between a second or alternative frame support member 20 and the ends of the shell roll 22 to provide the same controlled counterdeflection or bowing of the inner shaft 12. It can be seen that the biasing arrangement 34 may also be comprised of an electrically driven reduction gearing system. The sensor 36 may be alternatively comprised of a strain gauge, which may be placed at some point on the surface of the shaft 12, as indicated in FIGS. 2 and 3 at A'. This strain gauge would register the strain across the shaft 12, where the output of the strain gauge signal would be sent through the feedback network 38 and used in a closed loop fashion by allowing the control system to increase or decrease the bending force until the strain has reached a certain value even 0, indicating that the inner shaft 12 is straight or that it has attained a configuration where the roll shell 22 is maintained straight. Additionally, overbending or underbending of the inner shaft 12 may be desired but this could be established by proper input into the control circuit 42. Other sensing means and/or biasing arrangements could be used without departing from the scope of the invention.

It is intended, therefore, that the following claims are illustrative only since changes and modifications may be made by those skilled in the art after having had the benefit of seeing this invention without departing from the spirit and scope thereof.

I claim:

1. A controlled deflection roll comprising:
    a shaft having a support arrangement near the ends thereof;
    a shell roll journaled about said shaft, said shell roll and said shaft having a radial space therebetween;
    a pressure sensor disposed within said shaft;
    a biasing arrangement disposed near at least one end of said shaft to apply a bending moment across said shaft in response to a signal from said sensor;
    at least two radially directed cylinders having a piston disposed therewith and spaced in said shaft;
    a hydrostatic bearing pad on the outer end of each of said radially directed pistons facing the inside surface of said shell roll; and
    a manifold circuit arrangement extending through said shaft from at least one end thereof for conducting pressurized fluid to the vicinity of each of said radially disposed cylinders and pads, said conduit arrangement permitting pressurized fluid to be directed to said piston and bearing arrangement against the inner surface of said shell roll to help control deflection therein.

2. A control deflection as recited in claim 1, wherein said support arrangement is comprised of a pair of first support members, each of said first support members being disposed at a point on said shaft between said shell roll and said biasing arrangement, said bending across said shaft acting about said first support members.

3. A controlled deflection roll comprising:
    a shaft having a support arrangement near the ends thereof;
    a shell roll journaled about said shaft, said shell roll and said shaft having a radial space therebetween;
    a pressure sensor disposed within said shaft;
    at least two radially directed cylinders having a piston disposed therewith and spaced in said shaft;
    a hydrostatic bearing pad on the outer end of each of said radially directed pistons facing the inside surface of said shell roll; said pistons being controlled by fluid pressure from a governable source,
    said piston and hydrostatic bearing pads internally supporting said shell roll against deflection; and
    a biasing arrangement disposed near at least one end of said shaft to apply a bending moment across said shaft in response to a signal from said sensor within said shaft;
    said support arrangement being comprised of a pair of second support members, each of said biasing members being disposed at a point on said shaft between said second support members and said shell roll.

4. A controlled deflection roll comprising:
    a shaft having a support arrangement for each end thereof;
    a shell roll journaled about said shaft, said shell roll and said shaft having radial space therebetween;
    means carried by said shaft to support said shell roll against deflection including:
    at least one radially directed cylinder having a piston disposed therewith in said shaft;
    a hydrostatic bearing pad on the outer end of said piston facing the inside surface of said shell roll;
    a manifold conduit arrangement extending generally through said shaft from at least one end thereof for conducting fluid to the vicinity of said radially disposed cylinders and bearing pads, said conduit arrangement permitting pressurized fluid to be directed to said pistons and bearings for reaction against the inner surface of said shell roll to help control deflection therein; and a biasing arrangement disposed near at least one end of said shaft to apply a bending moment across said shaft in response to a signal from a strain gauge disposed on said shaft.

5. A controlled deflection roll as recited in claim 3, wherein each of said support arrangements are disposed between an end of said shell roll and said biasing arrangement.

6. A controlled deflection roll as recited in claim 3, wherein each of said biasing arrangements is disposed between an end of said shell roll and said support arrangement.

* * * * *

UNITED STATES PATENT OFFICE
CERTIFICATE OF CORRECTION

Patent No. 4,030,177      Dated June 21, 1977

Inventor(s) Peter Hold

It is certified that error appears in the above-identified patent and that said Letters Patent are hereby corrected as shown below:

Column 4, claim 1, line 15, delete "circuit" and insert -- conduit --.

Column 4, claim 2, line 1, after the word "deflection" insert -- roll --.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*